United States Patent
Lee et al.

(10) Patent No.: US 12,194,973 B2
(45) Date of Patent: Jan. 14, 2025

(54) METHOD FOR REMOVING FOREIGN OBJECT FROM BRAKE DEVICE

(71) Applicants: Hyundai Motor Company, Seoul (KR); Kia Corporation, Seoul (KR)

(72) Inventors: Sang Won Lee, Gyeonggi-do (KR); Won Jun Hwang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 389 days.

(21) Appl. No.: 17/750,584

(22) Filed: May 23, 2022

(65) Prior Publication Data
US 2023/0202447 A1    Jun. 29, 2023

(30) Foreign Application Priority Data
Dec. 27, 2021    (KR) .......................... 10-2021-0188475

(51) Int. Cl.
*B60T 17/22*    (2006.01)
*B60T 8/40*    (2006.01)
*B60T 13/68*    (2006.01)

(52) U.S. Cl.
CPC ............ *B60T 17/22* (2013.01); *B60T 8/4081* (2013.01); *B60T 13/686* (2013.01); *B60Y 2400/81* (2013.01)

(58) Field of Classification Search
None
See application file for complete search history.

(56) References Cited

U.S. PATENT DOCUMENTS

| | | | |
|---|---|---|---|
| 5,345,218 A * | 9/1994 | Woods ..................... | B60Q 1/44 340/472 |
| 2004/0040807 A1 | 3/2004 | Burgdorf et al. | |
| 2015/0274143 A1 | 10/2015 | Miyazaki et al. | |
| 2015/0294169 A1* | 10/2015 | Zhou ..................... | B60W 40/08 348/148 |
| 2017/0129470 A1* | 5/2017 | Choi ....................... | B60T 7/042 |
| 2020/0001842 A1 | 1/2020 | Seol | |
| 2021/0024050 A1 | 1/2021 | Ozeki | |
| 2021/0053544 A1 | 2/2021 | Seol et al. | |

FOREIGN PATENT DOCUMENTS

| | | | | |
|---|---|---|---|---|
| CN | 111615475 A | * | 9/2020 | ............ B60T 13/686 |
| DE | 102020106286 A1 | * | 2/2021 | ............... B60T 1/10 |
| JP | 2005-313767 A | | 11/2005 | |
| JP | 2006298132 A | * | 11/2006 | |
| JP | 6511964 B2 | | 5/2019 | |
| JP | 2021-112949 A | | 8/2021 | |
| KR | 2020-0003476 A | | 1/2020 | |
| WO | WO-2019133964 A1 | * | 7/2019 | ............. B60T 13/62 |
| WO | WO-2019189656 A1 | * | 10/2019 | ............... B60Q 9/00 |

* cited by examiner

*Primary Examiner* — Melody M Burch
(74) *Attorney, Agent, or Firm* — Fox Rothschild LLP

(57) ABSTRACT

A method of removing foreign objects from a brake device includes determining whether starting power is turned off in a state in which leakage of a hydraulic circuit is confirmed; and operating, while the starting power is turned off, a main master cylinder using standby power, and performing a foreign object removal mode in which hydraulic pressure is applied to a plurality of hydraulic regulating valves in the hydraulic circuit and released.

7 Claims, 10 Drawing Sheets

40: 41, 42, 43, 44, 45, 46, 47, 48, 49, 50, 51, 52, 53, 54, 55
60: 61, 62, 63, 64

40 : 41, 42, 43, 44, 45, 46, 47, 48, 49, 50, 51, 52, 53, 54, 55
60 : 61, 62, 63, 64

| MODE | FIRST FORWARD MODE | | FIRST BACKWARD MODE | | SECOND FORWARD MODE | | SECOND BACKWARD MODE | |
|---|---|---|---|---|---|---|---|---|
| HYDRAULIC PRESSURE | APPLYING | RELEASING | APPLYING | RELEASING | APPLYING | RELEASING | APPLYING | RELEASING |
| FIRST HYDRAULIC REGULATING VALVE |  |  |  | 1 |  |  |  | 1 |
| SECOND HYDRAULIC REGULATING VALVE |  |  | 1 |  |  |  | 1 |  |
| THIRD HYDRAULIC REGULATING VALVE | 1 |  |  |  | 1 |  |  |  |
| FOURTH HYDRAULIC REGULATING VALVE |  | 1 |  |  |  | 1 |  |  |
| FIFTH HYDRAULIC REGULATING VALVE | 1 |  | 1 |  | 1 |  |  |  |
| SIXTH HYDRAULIC REGULATING VALVE | 1 | 1 | 1 |  |  |  | 1 |  |
| SEVENTH HYDRAULIC REGULATING VALVE | 1 | 1 | 1 | 1 |  | 1 |  | 1 |
| EIGHTH HYDRAULIC REGULATING VALVE |  |  |  |  |  |  |  | 1 |
| NINTH HYDRAULIC REGULATING VALVE |  |  |  |  |  |  |  | 1 |
| TENTH HYDRAULIC REGULATING VALVE |  |  |  |  |  | 1 |  |  |
| ELEVENTH HYDRAULIC REGULATING VALVE |  |  |  |  |  | 1 |  |  |
| TWELFTH HYDRAULIC REGULATING VALVE |  | 1 |  | 1 |  |  |  | 1 |
| THIRTEENTH HYDRAULIC REGULATING VALVE |  | 1 |  | 1 |  |  |  | 1 |
| FOURTEENTH HYDRAULIC REGULATING VALVE |  | 1 |  | 1 |  | 1 |  |  |
| FIFTEENTH HYDRAULIC REGULATING VALVE |  | 1 |  | 1 |  | 1 |  |  |

FIG. 10

METHOD FOR REMOVING FOREIGN OBJECT FROM BRAKE DEVICE

CROSS-REFERENCE TO RELATED APPLICATION(S)

The application claims priority from Korean Patent Application No. 10-2021-0188475 filed on Dec. 27, 2021, the disclosure of which is incorporated herein by reference in its entirety.

TECHNICAL FIELD

The present disclosure relates to a method of removing foreign objects from a brake device by which, when leakage due to foreign objects is sensed in a valve included in a hydraulic circuit of a brake device, the brake device may remove foreign objects therefrom.

BACKGROUND

An electronic brake device linked to an integrated electric booster (IEB) may generate hydraulic pressure by receiving a driver's intent to brake as an electric signal when the driver depresses a brake pedal. Alternatively, in an autonomous vehicle, an electronic brake device may generate hydraulic pressure in response to a request from an autonomous driving control unit. Hydraulic pressure generated as above may be transmitted to a wheel cylinder installed in each wheel which results in friction braking.

To this end, an electronic brake device may include a plurality of hydraulic regulating valves in a hydraulic circuit connecting wheel cylinders of wheels to each other from a reservoir storing hydraulic oil. The hydraulic regulating valves may be opened and closed by being controlled by a control unit separately mounted on the electronic brake device.

When leakage of hydraulic pressure occurs in one of the plurality of hydraulic regulating valves due to foreign objects, normal braking may not be possible. Additionally, a lowered braking force due to the leakage of hydraulic pressure may lead to a vehicular accident.

In some situations, when a leakage of hydraulic pressure is sensed in the electronic brake device, the control unit may inform the driver (or a passenger) of the malfunctioning situation. However, it is usually impossible to remove foreign objects autonomously and the vehicle may need to be brought to a repair shop in order to remedy the leakage of hydraulic pressure.

The above descriptions regarding background technologies have been made only for enhancement of understanding of the background of the present disclosure, and are not to be deemed by those skilled in the art to correspond to already-know prior arts, and should not be taken as acknowledgment that this information forms any part of prior art.

SUMMARY

An aspect of embodiments of the present disclosure is to provide a method of removing foreign objects from a brake device by which, when leakage due to foreign objects is sensed in a valve included in a hydraulic circuit of a brake device, the brake device may remove foreign objects.

According to an aspect of embodiments of the present disclosure, a method of removing foreign objects from a brake device includes determining whether starting power is turned off in a state in which leakage of a hydraulic circuit is confirmed; and operating, while the starting power is turned off, a main master cylinder using standby power, and performing a foreign object removal mode in which hydraulic pressure is applied to a plurality of hydraulic regulating valves in the hydraulic circuit and released.

The method may further be configured to include determining whether, after the starting power is turned off and a door of a vehicle is opened, a predetermined period of time has elapsed since the door has been closed and locked.

The foreign object removal mode may further be configured to include applying the standby power to a motor and moving a power piston of the main master cylinder forward or backward; applying, after the power piston is displaced, power to a portion of the plurality of hydraulic regulating valves included in the hydraulic circuit and operating corresponding hydraulic regulating valves; and operating an entirety of the plurality of hydraulic regulating valves in sequence by repeating the foregoing steps. As used herein, "a portion of the plurality of hydraulic regulating valves" refers to some number of valves that is less than the entirety or all of the plurality of hydraulic regulating valves. In certain embodiments, all of the plurality of hydraulic regulating valves may be employed.

The foreign object removal mode may further be configured to include a first forward mode for moving the power piston forward; a first backward mode for moving the power piston backward; a second forward mode for moving the power piston forward again, and a second backward mode for moving the power piston backward again.

In the first forward mode and the first backward mode, a portion of the plurality of hydraulic regulating valves may operate such that hydraulic pressure may reach a front wheel cylinder and a rear wheel cylinder from the main master cylinder, in the second forward mode, a portion of the plurality of hydraulic regulating valves may operate such that hydraulic pressure may reach only the front wheel cylinder from the main master cylinder, and in the second backward mode, a portion of the plurality of hydraulic regulating valves may operate such that hydraulic pressure may reach only the rear wheel cylinder from the main master cylinder.

The foreign object removal mode may be configured to be performed within eight seconds.

The method may further include performing a self-diagnosis mode for determining leakage of the hydraulic circuit by operating the main master cylinder using the standby power after performing the foreign object removal mode; determining whether the hydraulic circuit is normal in the self-diagnosis mode; and determining, when the hydraulic circuit is normal, whether the foreign object removal mode is performed one time.

The step of determining whether the hydraulic circuit is normal in the self-diagnosis mode may include determining that displacement of the power piston of the main master cylinder reaches a predetermined critical displacement after a predetermined period of time and pressure formed at the predetermined critical displacement is above a reference pressure.

When it is confirmed that leakage of the hydraulic circuit still continues in the self-diagnosis mode, a warning light may be turned on or some functions of the vehicle may be restricted.

When it is confirmed that the foreign object removal mode is performed one time, the vehicle may return to a normal state in which leakage of hydraulic pressure does not occur, and when it is confirmed that the foreign object removal mode is performed more than one time, a warning light may be turned on, and some functions of the vehicle that were restricted due to leakage of the hydraulic circuit may be restored to a normal state.

BRIEF DESCRIPTION OF DRAWINGS

The above and other aspects, features, and advantages of the present disclosure will be more clearly understood from the following detailed description, taken in conjunction with the accompanying lead-outs, in which:

FIG. 10 is a table listing hydraulic regulating valves operating in sequence in a foreign object removal mode in accordance with example embodiments of the present disclosure.

DETAILED DESCRIPTION

Figure 1:
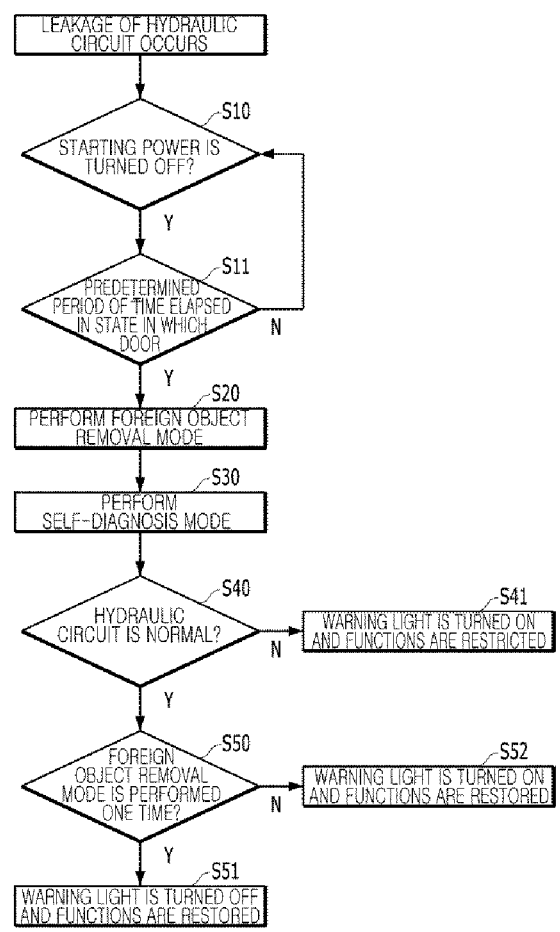
FIG. 1 is a flowchart illustrating a method of removing foreign objects from a brake device according to an example embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

In the description below, embodiments of the present disclosure will be described as follows with reference to the attached drawings.

In the drawings, the same elements will be indicated by the same reference numerals.

Terms such as "first" and "second" may be used in describing various elements, but the above elements shall not be restricted to the above terms. The above terms are used only to distinguish one element from the other.

In example embodiments, a four-wheeled vehicle will be described as an example, but this disclosure is not limited thereto. For example, the present disclosure may be applied to any vehicle with two or more wheels.

FIG. 1 is a flowchart illustrating a method of removing foreign objects from a brake device according to an example embodiment.

A method of removing foreign objects from a brake device according to an example embodiment may include determining whether starting power is turned off in a state in which leakage of a hydraulic circuit is confirmed (S10); and operating, while the starting power is turned off, a main master cylinder 30 (see FIGS. 2 to 9) using standby power, and performing a foreign material removal mode in which hydraulic pressure is applied to a plurality of hydraulic regulating valves in the hydraulic circuit and released (S20).

Leakage of the hydraulic circuit may be identified by a control unit (not illustrated).

The control unit may include a controller (ECU) separately mounted, and the controller may be configured to perform a control function and a communication function of the control unit.

However, the configuration of the control unit is not necessarily limited to the above example, and for example, the function may be combined with an ECU linked to an electronic stability control (ESC) of a vehicle or a control system (e.g., a vehicle control unit (VCU)) of a vehicle, or may be used together with the systems.

The ECU (or VCU) may be implemented as various processing devices such as a microprocessor in which a semiconductor chip performing various computations or commands is embedded, and may control operations of each component of the brake device.

The control unit may exchange various information or signals necessary for braking with a corresponding component via a communication link. As the communication link, for example, wireless communication such as a local area network using a controller area network (CAN) protocol may be employed, but an example embodiment thereof is not limited thereto, and wired or optical communication may be applied.

Also, the control unit may further include a timer (not illustrated) or may be configured to be electrically connected to a timer and may be configured to obtain time data from the timer.

The brake device may be an electronic brake device to which IEB is applied. When the driver steps on a brake pedal 11 (see FIGS. 2 to 9), the electronic brake device may generate hydraulic pressure by receiving the driver's intention for braking as an electrical signal, or the electronic brake device may generate hydraulic pressure in response to a request of the autonomous driving control unit in an autonomous vehicle. Hydraulic pressure generated as above may be transmitted to wheel cylinders 60 (see FIGS. 2 to 9) installed in each of wheels RL, RR, FL, and FR (see FIGS. 2 to 9) and may perform friction braking.

The brake device may include a plurality of hydraulic regulating valves 40 in a hydraulic circuit connecting the wheel cylinders of the wheels RL, RR, FL, and FR to each other from a reservoir 10 (see FIGS. 2 to 9) storing hydraulic oil. These hydraulic regulating valves may be configured to be opened and closed by being controlled by a control unit. Accordingly, the brake device may be configured to be controlled such that hydraulic pressure is transmitted to each wheel along the hydraulic circuit. The brake device will be described in greater detail later in the present disclosure.

For example, the control unit may be configured to determine that leakage occurs somewhere in the hydraulic circuit when a power piston 31 (see FIGS. 2 to 9) of the main master cylinder 30 moves forward and the displacement of the power piston reaches a predetermined critical displacement (that is, leakage determination reference displacement) after a predetermined period of time and the pressure (the measured pressure) formed at a specific critical displacement is not more than a determined reference pressure (leakage determination reference pressure), and also a difference between the pressure required by the driver or the autonomous driving control unit and the formed pressure is greater than the determined reference difference.

Alternatively, the control unit may be configured to determine that leakage occurs somewhere in the hydraulic circuit when a level of hydraulic oil in the reservoir measured by a liquid amount sensor (not illustrated) of the reservoir 10 is maintained below the reference level determined for a predetermined period of time.

Alternatively, the control unit may be configured to determine that leakage occurs somewhere in the hydraulic circuit when the power piston 31 of the main master cylinder 30 is moved backward and a current provided to a motor 32 (see FIGS. 2 to 9) is below a reference current value as compared to the displacement of the power piston.

When leakage of the hydraulic circuit is confirmed, the control unit may be configured to turn on a corresponding warning light in the interior of the vehicle or on an instrument panel, or may be configured to restrict some of the functions of the vehicle.

One of the causes of various leakages may be foreign objects caught in the hydraulic regulating valve of at least one of the plurality of hydraulic regulating valves 40 provided in the hydraulic circuit. In an example embodiment, a method is provided for removing foreign objects in the hydraulic regulating valve autonomously to address leakage due to the trapping of the foreign objects, in a state in which leakage of the hydraulic circuit is confirmed.

The method for removing foreign objects from the brake device according to an example embodiment may include checking whether starting power is turned off to confirm a parking intention of the driver (or a passenger) when leakage of the hydraulic circuit is confirmed (S10).

In the state in which leakage of the hydraulic circuit is confirmed, braking performance of the vehicle may be unstable and uncertain. It may be desirable for the safety of the vehicle and the driver (or a passenger) to perform the method of removing foreign objects from a brake device such as in the example embodiment after the vehicle is safely parked.

It may also advisable to perform the method after the vehicle is safely parked because removing foreign objects as in the example embodiment may entail the operation of the hydraulic circuit, that is, the operation of the main master cylinder 30 and the plurality of hydraulic regulating valves 40 provided in the hydraulic circuit. If the hydraulic circuit is operated while the vehicle is running or the engine is turned on, each component may be overloaded, the components may be damaged or may malfunction.

Accordingly, the method of removing foreign objects from a brake device according to an example embodiment may be carried out after the starting power is turned off in order to secure safety and to prevent overload, damages or malfunction in advance.

Alternatively, the method of removing foreign objects from the brake device according to an example embodiment may further include determining whether, after the starting power is turned off, a door of a vehicle is opened and the driver (or a passenger) exits the vehicle, a predetermined period of time (about one minute) has elapsed since the door has been closed and locked (S11).

The signal related to the opening, closing and locking of the door may be input to the control unit from, for example, a contact sensor (not illustrated) and an actuator installed on the door or the vehicle body, and time data may be provided to the control unit by a timer.

The reason for confirming the driver (or a passenger) exits the vehicle may be for safety of the driver (or a passenger).

Also, as described above, since the method of removing foreign objects in the example embodiment may entail the operation of the hydraulic circuit, a minute noise or vibration may occur during the operation of the hydraulic circuit. A driver (or a passenger) in the vehicle may misunderstand such noise or vibration as a serious malfunctioning and may report the malfunctioning or may file a claim.

Accordingly, by configuring the control unit to set a time required for the driver (or a passenger) to stay away at a predetermined distance from the vehicle after the driver (or a passenger) exits, and determining whether the determined time elapses, minute noises or vibrations may be prevented from being transmitted to the driver (or a passenger).

As described above, by further including the step of determining whether the state in which the door is locked is maintained for a predetermined period of time after the driver (or a passenger) exits, the method for removing foreign objects from the brake device according to an example embodiment may improve marketability of the vehicle.

While the starting power is turned off, the operation (S20) of performing a foreign object removal mode using standby power may be performed.

For the understanding of the foreign object removal mode in the example embodiment, the configuration of the brake device to which an IEB is applied will be described in the description below. FIGS. 2 to 9 are circuit diagrams illustrating a hydraulic circuit of a brake device in foreign material removal mode in accordance with the example embodiments described below.

The reservoir 10 may store hydraulic oil for generating hydraulic pressure. The reservoir may include a plurality of reservoir chambers therein, and may include a liquid amount sensor (not illustrated).

The brake pedal 11 may be connected to a sub-master cylinder 20, and the sub-master cylinder may generate hydraulic pressure by pressing the brake pedal.

Also, the sub-master cylinder 20 may include a pedal cylinder 21 and a pedal simulator 22, and may be divided into two chambers 23 and 24. For example, the first chamber 23 and the second chamber 24 may be provided.

In the sub-master cylinder 20, a main piston 25 directly connected to the brake pedal 11, and a sub-piston 26 connected to the main piston by a first spring 27 and also connected to an internal wall surface on one end side of the sub-master cylinder by a second spring 28 may be installed.

The first chamber 23 may be partitioned between the main piston 25 and the sub-piston 26 in the sub-master cylinder 20, and the second chamber 24b may be partitioned between the sub-piston and the internal wall surface on one end side of the sub-master cylinder.

The first chamber 23 and the second chamber 24 may be connected to the reservoir 10.

For example, when the driver's pedal force is applied to the brake pedal 11, hydraulic pressure may be generated in the first chamber 23 in the pedal cylinder 21 by the main piston 25, and the generated hydraulic pressure may be transmitted to the sub-piston 26 of the second chamber 24 in the pedal simulator 22 and the second spring 28 of the pedal simulator 22 may be pressed. By the reaction force of the second spring pressed, a feeling of braking may be simulated and may be transmitted to the driver.

In the brake device, substantial hydraulic pressure may be generated in the main master cylinder 30 operating by the driving of the motor 32.

In the main master cylinder 30, the power piston 31 for generating hydraulic pressure may be configured to be able to move back and forth, and the main master cylinder may be partitioned into two chambers 33 and 34. For example, a third chamber 33 and a fourth chamber 34 may be provided.

The front surface portion of the power piston 31 together with the internal wall surface of the main master cylinder 30 may partition the third chamber 33, and the rear surface portion of the power piston 31 together with the internal wall surface of the main master cylinder may partition the fourth chamber 34.

Hydraulic oil for generating hydraulic pressure may be supplied to the main master cylinder 30 from the reservoir 10.

A motor 32 providing a forward and backward motion force to the power piston may be connected to a rear end of the power piston 31.

The motor 32 may operate by an electrical signal output in response to a stroke of the brake pedal 11. For example, a pedal travel sensor 12 for sensing a stroke when the brake pedal is pressed may be mounted in a position adjacent to the brake pedal.

When the driver (or a passenger) depresses on the brake pedal 11, the pedal travel sensor 12 may be configured to sense the stroke of the brake pedal and may be configured to transmit a signal to the control unit, and the control unit may be configured to control the operation of the motor 32 based on the received sensed signal. Accordingly, hydraulic pressure generated in the main master cylinder 30 may be controlled.

This main master cylinder 30 may be configured to be driven by the motor 32 controlled by the control unit and may be configured to generate hydraulic pressure, and may be configured to provide hydraulic pressure to the wheel cylinder 60 for braking each wheel RL, RR, FL, and FR.

To this end, the brake device may include a plurality of hydraulic flow passages and a plurality of hydraulic regulating valves 40.

A plurality of hydraulic regulating valves 40 may be provided in the corresponding hydraulic flow path, and each hydraulic regulating valve may be configured to operate under the control of the control unit and may be configured to open and close the corresponding hydraulic flow path. The plurality of hydraulic regulating valves 40 may include first to seventh hydraulic regulating valves 41 to 47.

The first hydraulic regulating valve 41 may be provided in a hydraulic flow path connecting the reservoir 10 to the second chamber 24 of the sub-master cylinder 20.

The second hydraulic regulating valve 42 may be provided in the hydraulic flow path connecting the second chamber 24 of the sub-master cylinder 20 to the fourth chamber 34 of the main master cylinder 30.

The third hydraulic regulating valve 43 may be provided in the hydraulic flow path connecting the first chamber 23 of the sub-master cylinder 20 to the third chamber 33 of the main master cylinder 30.

The fourth hydraulic regulating valve 44 may be provided in a hydraulic flow path connecting the reservoir 10 to the third chamber 33 of the main master cylinder 30.

The fifth hydraulic regulating valve 45 may be provided in a hydraulic flow path connecting the third chamber 33 of the main master cylinder 30 to the wheel cylinders 60, such as, for example, front wheel cylinders 63 and 64.

The sixth hydraulic regulating valve 46 may be provided in a hydraulic flow path connecting the fourth chamber 34 of the main master cylinder 30 to the wheel cylinders 60, such as, for example, rear wheel cylinders 61 and 62.

The seventh hydraulic regulating valve 47 may be provided in a connection hydraulic flow path 47a connecting a hydraulic flow path connecting the fifth hydraulic regulating valve 45 to the front wheel cylinders 63 and 64, and a hydraulic flow path connecting the sixth hydraulic regulating valve 46 to the rear wheel cylinders 61 and 62.

The fourth hydraulic regulating valve 44 and the seventh hydraulic regulating valve 47 may be configured as split shutoff valves, and may include a spring for maintaining a predetermined or higher pressure in a state in which power is not applied.

The first to seventh hydraulic regulating valves 41 to 47 may each independently be configured as solenoid valves controlled by the control unit.

The first hydraulic regulating valve 41, the fourth hydraulic regulating valve 44, and the seventh hydraulic regulating valve 47 may be configured as a normally closed type valve, wherein the normally closed type valve is closed when power is not applied.

The second hydraulic regulating valve 42, the third hydraulic regulating valve 43, the fifth hydraulic regulating valve 45, and the sixth hydraulic regulating valve 46 may be configured as a normally open type valve, wherein the normally open type valve is open when power is not applied.

A check valve 45a may be installed in the fifth hydraulic regulating valve 45. The check valve may be opened when hydraulic pressure in the third chamber 33 is equal to or higher than a predetermined pressure, and the check valve may allow hydraulic pressure in the third chamber to bypass to be provided to the wheel cylinder 60 even when the fifth hydraulic regulating valve is closed.

A check valve 46a may be installed in the sixth hydraulic regulating valve 46. The check valve may be opened when hydraulic pressure in the fourth chamber 34 is equal to or higher than a predetermined pressure, and the check valve may allow hydraulic pressure in the fourth chamber to bypass to be provided to the wheel cylinder 60 even when the sixth hydraulic regulating valve is closed.

The wheel cylinder 60 may include a first wheel cylinder 61 for braking a rear left wheel RL of the vehicle, a second wheel cylinder 62 for braking a rear right wheel RR of the vehicle, a third wheel cylinder 63 for braking a front left wheel FL of the vehicle, and a fourth wheel cylinder 64 for braking a front right wheel FR of the vehicle.

To regulate hydraulic pressure provided to the wheel cylinders 60, a plurality of hydraulic regulating valves 40 may be provided in the corresponding hydraulic flow path, and each hydraulic regulating valve may operate under the control of the control unit and may open and close the corresponding hydraulic flow path. The plurality of hydraulic regulating valves 40 may include eighth to fifteenth hydraulic regulating valves 48 to 55.

The eighth to eleventh hydraulic regulating valves 48 to 51 may be provided in the hydraulic flow path between the main master cylinder 30 and the wheel cylinder 60. The eighth to eleventh hydraulic regulating valves may act as inlet valves for controlling hydraulic oil supplied to each wheel cylinder.

The hydraulic flow path connecting the fifth hydraulic regulating valve 55 to the front wheel cylinders 63 and 64 may be connected to the third chamber 33 of the main master cylinder 30, and may guide the hydraulic pressure to the front wheel cylinders mounted on the two front wheels FL and FR.

Also, the hydraulic flow path connecting the sixth hydraulic regulating valve 56 to the rear wheel cylinders 61 and 62 may be connected to the fourth chamber 34 of the main master cylinder 30, and may guide the hydraulic pressure to the rear wheel cylinders mounted on the two rear wheels RL and RR.

The twelfth to fifteenth hydraulic regulating valves 52 to 55 may be provided in the hydraulic flow path between the wheel cylinder 60 and the reservoir 10. The twelfth to fifteenth hydraulic regulating valves may act as outlet valves for controlling hydraulic oil discharged from each wheel cylinder.

The eighth to fifteenth hydraulic regulating valves 48 to 55 may also be configured as a solenoid valve controlled by the control unit.

The eighth to eleventh hydraulic regulating valves 48 to 51 may be configured as a normally open type valve, which is open when no power is applied.

The twelfth to fifteenth hydraulic regulating valves 52 to 55 may be configured as a normally closed type valve, which is closed when no power is applied.

The check valves 48a, 49a, 50a, and 51a for preventing a reverse flow of hydraulic oil may be installed in the eighth to eleventh hydraulic regulating valves 48 to 51, that is, the inlet valves, respectively.

The hydraulic flow path connecting the third hydraulic regulating valve 43 to the sub-master cylinder 20 may include a first pressure sensor 13 for measuring hydraulic pressure.

Also, the hydraulic flow path connecting the fifth hydraulic regulating valve 45 to the front wheel cylinders 63 and 64 may include a second pressure sensor 14 for measuring hydraulic pressure.

Also, the hydraulic flow path connecting the sixth hydraulic regulating valve 46 to the rear wheel cylinders 61 and 62 may include a third pressure sensor 15 for measuring hydraulic pressure.

The control unit may be electrically connected to the liquid amount sensor in the reservoir 10, the pedal travel sensor 12, the motor 32, the plurality of hydraulic regulating valves 40, the plurality of check valves 45a, 46a, 48a, 49a, 50a, and 51a, and the plurality of pressure sensors 13, 14, and 15, and may obtain data related to the operating state of the hydraulic circuit.

Hereinafter, the operation of the brake device configured as described in the example embodiment above will be described.

When a driver's pedal force is applied to the brake pedal 11, hydraulic pressure may be generated by the sub-master cylinder 20, and the generated hydraulic pressure may be transmitted to the sub-piston 26 of the pedal simulator 22 such that the second spring 28 of the pedal simulator may be pressed. By the reaction force of the second spring pressed, a feeling of braking may be simulated and may be transmitted to the driver.

The motor 32 may operate under the control of the control unit based on the signals output by the pedal travel sensor 12 and the first pressure sensor 13 as the brake pedal 11 is pressed, and in the main master cylinder 30, braking hydraulic pressure may be formed through the power piston 31 moving forward and backward by the motor.

When power is applied to the sixth hydraulic regulating valve 46 and the sixth hydraulic regulating valve is in a closed state, and in this state, the motor 32 is driven to move forward the power piston 31 and pressure of the third chamber 33 increases, hydraulic oil stored in the third chamber may pass through the fifth hydraulic regulating valve 45 and may reach the front wheel cylinders 63 and 64 through the tenth hydraulic regulating valve 50 and the eleventh hydraulic regulating valve 51.

Simultaneously, as power is applied to the seventh hydraulic regulating valve 47 and the seventh hydraulic regulating valve is in an open state, the hydraulic oil supplied through the fifth hydraulic regulating valve 45 may reach the rear wheel cylinders 61 and 62 through the eighth hydraulic regulating valve 48 and the ninth hydraulic regulating valve 49.

Thereafter, power may be applied to the fifth hydraulic regulating valve 45 such that the fifth hydraulic regulating valve may be in a closed state, power may be applied to the fourth hydraulic regulating valve 44 such that the fourth hydraulic regulating valve may be in an open state, and power may be applied to the second hydraulic regulating valve 42 such that the second hydraulic regulating valve may be in a closed state.

Also, the application of power to the sixth hydraulic regulating valve 46 may be released, such that the sixth hydraulic regulating valve may be in an open state. In this state, when the motor 32 is driven and the power piston 31 moves backward such that pressure of the fourth chamber 34 increases, the hydraulic oil stored in the fourth chamber may pass through the sixth hydraulic regulating valve 46 and may reach the rear wheel cylinders 61 and 62 through the eighth hydraulic regulating valve 48 and the ninth hydraulic regulating valve 49.

Simultaneously, as power is applied to the seventh hydraulic regulating valve 47 such that the seventh hydraulic regulating valve is in an open state, the hydraulic oil supplied through the sixth hydraulic regulating valve 46 may reach the front wheel cylinders 63 and 64 through the tenth hydraulic regulating valve 50 and the eleventh hydraulic regulating valve 51.

For example, when the motor 32 is in an inoperable state, the brake device may be driven by the brake pedal 11. When it is determined that the motor is inoperable and the driver's pedal force is applied to the brake pedal, the hydraulic oil pressurized in the sub-master cylinder 20 may pass through the third and fifth hydraulic regulating valves 43 and 45 which are in an open state and may reach the front wheel cylinders 63 and 64 through the tenth hydraulic regulating valve 50 and the eleventh hydraulic regulating valve 51.

Also, by the hydraulic oil supplied from the sub-master cylinder 20 to the third chamber 33 of the main master cylinder 30, when the power piston 31 moves backward and increases the pressure of the fourth chamber 34, the hydraulic oil stored in the fourth chamber may pass through the sixth hydraulic regulating valve 46 and may reach the rear wheel cylinders 61 and 62 through the eighth hydraulic regulating valve 48 and the ninth hydraulic regulating valve 49. As described above, the fourth chamber may be pressed by the hydraulic oil supplied to the third chamber of the main master cylinder such that loss of braking pressure may be prevented in the brake device.

In the brake device configured as described above, the foreign object removal mode in the example embodiment may be configured such that, by the process of applying and releasing hydraulic pressure in the direction the same as the direction in which the hydraulic circuit applies hydraulic pressure during normal braking, the hydraulic regulating valves 40 included in the hydraulic circuit may be open and closed to remove, for example, foreign objects caught between the valve body and the valve seat, and accordingly, the hydraulic circuit of the brake device may be restored to a normal state in which leakage of hydraulic pressure does not occur.

To this end, the foreign object removal mode of the method of removing foreign objects from the brake device according to an example embodiment may include applying the standby power to a motor 32 and moving the power piston 31 of the main master cylinder 30 forward or backward; applying, after the power piston is displaced, power to a portion of the plurality of hydraulic regulating valves 40 included in the hydraulic circuit and operating the corresponding hydraulic regulating valves; and operating an entirety of the plurality of hydraulic regulating valves in sequence by repeating the aforementioned operations.

The foreign object removal mode in the example embodiment may include a first forward mode for moving the power piston 31 forward, a first backward mode for moving the power piston 31 backward, a second forward mode for moving the power piston 31 forward again, and a second backward mode for moving the power piston 31 backward again.

FIGS. 2 to 9 are circuit diagrams illustrating a hydraulic circuit of a brake device in a foreign material removal mode. In the drawings, a relatively thick solid line of a hydraulic flow path indicates a flow path to which hydraulic pressure is applied, and a hydraulic regulating valve marked by a dotted square line indicates a valve applied with power and currently operating.

Figure 2:
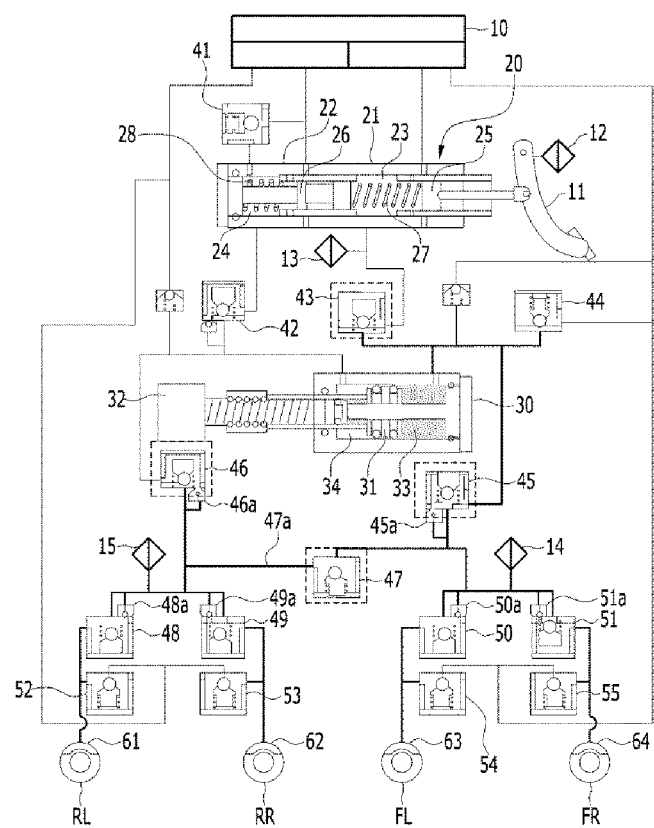
FIG. 2 is a circuit diagram illustrating a hydraulic circuit of a brake device in foreign object removal mode when the first forward mode is performed in accordance with example embodiments of the present disclosure.
Figure 3:
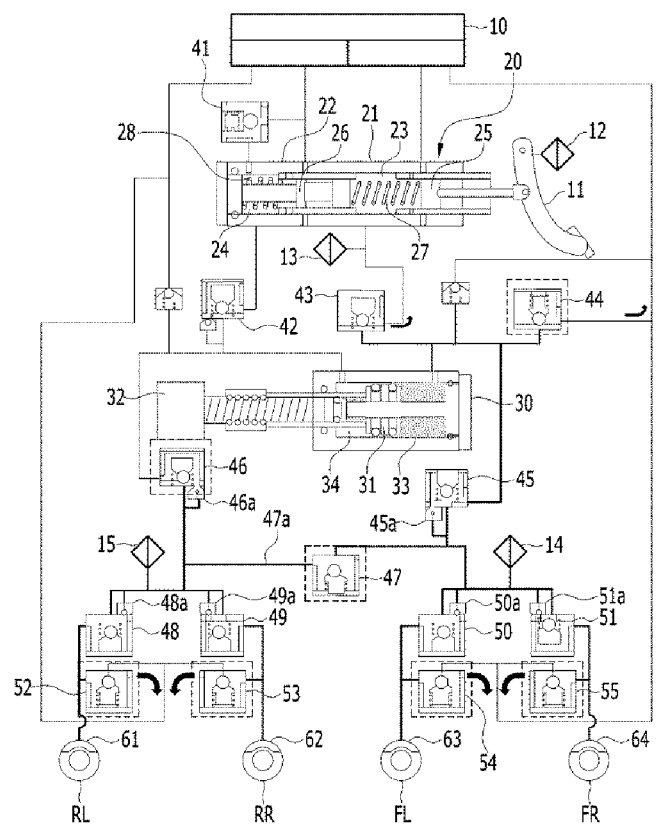
FIG. 3 is a circuit diagram illustrating a hydraulic circuit of a brake device in foreign object removal mode when the first forward mode is performed in accordance with example embodiments of the present disclosure.

FIGS. 2 and 3 are circuit diagrams illustrating a hydraulic circuit when a first forward mode is performed.

In the state in which leakage of the hydraulic circuit is confirmed, and while the starting power is turned off, the control unit may perform the first forward mode of the foreign object removal mode for self-measure using the standby power applied to the vehicle for about 10 minutes.

The motor 32 to which the standby power is applied may operate in the forward direction under the control of the control unit, and in the main master cylinder 30, braking hydraulic pressure may be formed through the power piston 31 moving forward by the motor.

Power may be applied to the sixth hydraulic regulating valve 46 such that the sixth hydraulic regulating valve may be in a closed state, power may be applied to the fifth hydraulic regulating valve 45 such that the fifth hydraulic regulating valve may be in a closed state, and power may be applied to the third hydraulic regulating valve 43 such that the third hydraulic regulating valve may be in a closed state. The fourth hydraulic regulating valve 44 may be normally closed when no power is applied, that is, when the power is turned off.

In this state, when the motor 32 is driven and the power piston 31 moves forward such that the pressure of the third chamber 33 increases, the hydraulic oil stored in the third chamber may pass through the check valve 45a of the fifth hydraulic regulating valve 45 and may reach the front wheel cylinders 63 and 64 through the tenth hydraulic regulating valve 50 and the eleventh hydraulic regulating valve 51.

Simultaneously, as power is applied to the seventh hydraulic regulating valve 47 and the seventh hydraulic regulating valve may be in an open state, such that the hydraulic oil supplied through the fifth hydraulic regulating valve 45 may reach the rear wheel cylinders 61 and 62 through the eighth hydraulic regulating valve 48 and the ninth hydraulic regulating valve 49.

As such, to apply hydraulic pressure in the first forward mode, power may be applied to the third hydraulic regulating valve 43, the fifth hydraulic regulating valve 45, the sixth hydraulic regulating valve 46 and the seventh hydraulic regulating valve 47 for a short period of time such that the hydraulic regulating valves may operate. The period of time for when power is applied may be about one second.

Thereafter, power may be continuously applied to the sixth hydraulic regulating valve 46 such that the sixth hydraulic regulating valve may be in a closed state.

To release the pressure in the hydraulic circuit for applying hydraulic pressure to the wheel cylinders 60, the power may be turned off in the third hydraulic regulating valve 43 and the fifth hydraulic regulating valve 45 such that the third hydraulic regulating valve and the fifth hydraulic regulating valve may be in an open state. Also, power may be applied to the fourth hydraulic regulating valve 44 and the seventh hydraulic regulating valve 47, such that the fourth hydraulic regulating valve and the seventh hydraulic regulating valve may be in an open state.

Also, power may be applied to the twelfth to fifteenth hydraulic regulating valves 52 to 55 such that the twelfth to fifteenth hydraulic regulating valves may be in an open state. Accordingly, hydraulic oil from the hydraulic circuit and each wheel cylinder 60 may be discharged to the reservoir 10 such that the pressure in the hydraulic circuit may be released.

As such, to release hydraulic pressure of the first forward mode, the power may be applied to the fourth hydraulic regulating valve 44, the sixth hydraulic regulating valve 46, the seventh hydraulic regulating valve 47, and the twelfth to fifteenth hydraulic regulating valves 52 to 55 for a short duration of time such that the hydraulic regulating valves may operate. The duration of time when power is applied may be about one second.

In the first forward mode, the third to seventh hydraulic regulating valves 43 to 47 and the twelfth to fifteenth hydraulic regulating valves 52 to 55 may operate by the application of power at least one time for about 2 seconds.

Figure 4:
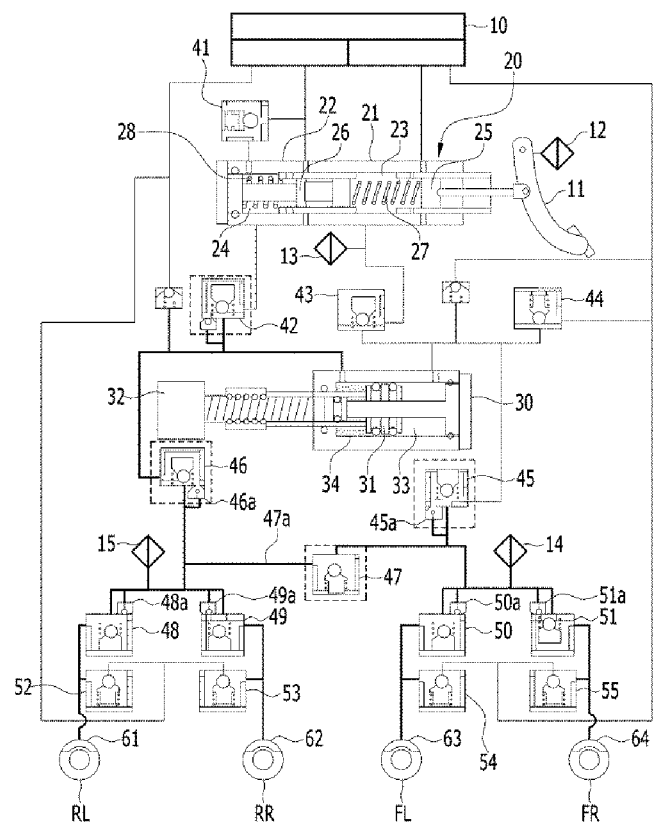
FIG. 4 is a circuit diagram illustrating a hydraulic circuit of a brake device in foreign object removal mode when the first backward mode is performed in accordance with example embodiments of the present disclosure.
Figure 5:
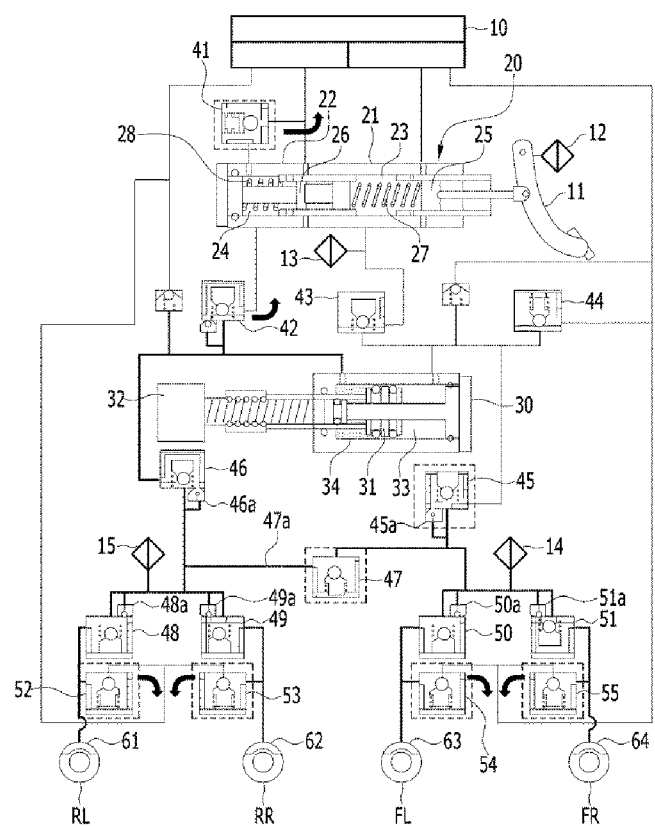
FIG. 5 is a circuit diagram illustrating a hydraulic circuit of a brake device in foreign object removal mode when the first backward mode is performed in accordance with example embodiments of the present disclosure.

FIGS. 4 and 5 are circuit diagrams illustrating a hydraulic circuit when the first backward mode is performed.

The motor 32 to which standby power is applied may operate in the reverse direction under the control of the control unit, and the main master cylinder 30 may generate braking hydraulic pressure through the power piston 31 moving backward by the motor.

Power may be applied to the sixth hydraulic regulating valve 46 such that the sixth hydraulic regulating valve may be in a closed state, power may be applied to the fifth hydraulic regulating valve 45 such that the fifth hydraulic regulating valve may be in a closed state, and power may be applied to the second hydraulic regulating valve 42 such that the second hydraulic regulating valve may be in a closed state.

In this state, when the motor 32 is driven and the power piston 31 moves backward such that the pressure of the fourth chamber 34 increases, the hydraulic oil stored in the fourth chamber may pass through the check valve 46a of the sixth hydraulic regulating valve 46 and may reach the rear wheel cylinders 61 and 62 through the eighth hydraulic regulating valve 48 and the ninth hydraulic regulating valve 49.

Simultaneously, power may be applied to the seventh hydraulic regulating valve 47 such that the seventh hydraulic regulating valve may be in an open state, and accordingly, the hydraulic oil supplied through the sixth hydraulic regulating valve 46 may reach the front wheel cylinders 63 and 64 through the tenth hydraulic regulating valve 50 and the eleventh hydraulic regulating valve 51

As such, to apply hydraulic pressure in the first backward mode, power may be applied to the second hydraulic regulating valve 42, the fifth hydraulic regulating valve 45, the sixth hydraulic regulating valve 46 and the seventh hydraulic regulating valve 47 for a short period of time such that the hydraulic regulating valves may operate. The duration of time when power is applied may be about one second.

Thereafter, power may be continuously applied to the fifth hydraulic regulating valve 45 such that the fifth hydraulic regulating valve may be in a closed state.

To release the pressure in the hydraulic circuit for applying hydraulic pressure to the wheel cylinders 60, the power may be turned off in the second hydraulic regulating valve 42 and the sixth hydraulic regulating valve 46 such that the second hydraulic regulating valve and the sixth hydraulic regulating valve may be in an open state. Also, power may be applied to the first hydraulic regulating valve 41 and the seventh hydraulic regulating valve 47, such that the first hydraulic regulating valve and the seventh hydraulic regulating valve may be in an open state.

Also, power may be applied to the twelfth to fifteenth hydraulic regulating valves 52 to 55 such that the twelfth to fifteenth hydraulic regulating valves may be in an open state. Accordingly, the hydraulic oil from the hydraulic circuit and each wheel cylinder 60 may be discharged to the reservoir 10 such that the pressure in the hydraulic circuit may be released.

As such, to release hydraulic pressure in the first backward mode, power may be applied to the first hydraulic regulating valve 41, the fifth hydraulic regulating valve 45, the seventh hydraulic regulating valve 47, and the twelfth to fifteenth hydraulic regulating valves 52 to 55 for a short period of time such that the hydraulic regulating valves may operate. The duration of time when power is applied may be about one second.

In the first backward mode, the first hydraulic regulating valve 41, the second hydraulic regulating valve 42, the fifth to seventh hydraulic regulating valves 45 to 47, and the twelfth to fifteenth hydraulic regulating valves 52 to 55 may operate by the application of power at least one time for about 2 seconds.

Figure 6:
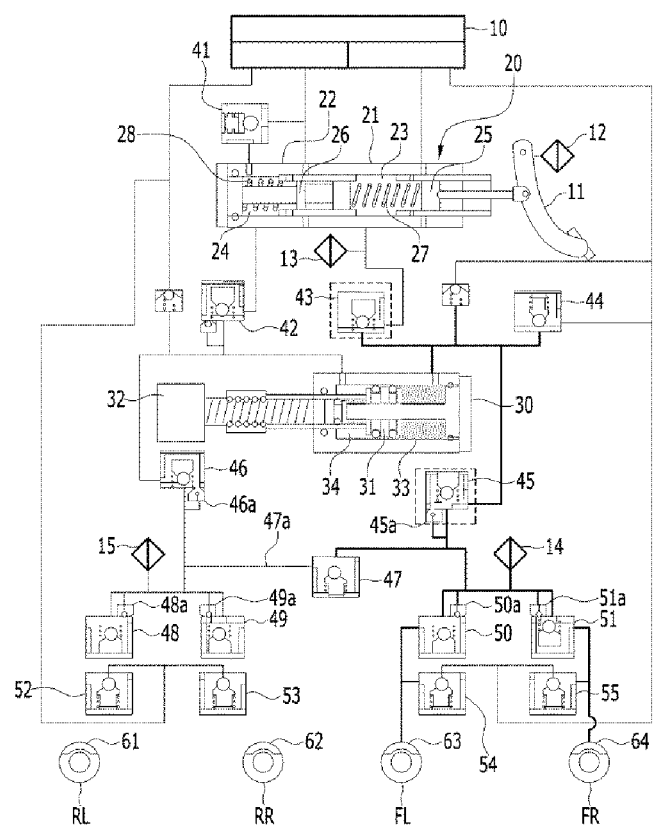
FIG. 6 is a circuit diagram illustrating a hydraulic circuit of a brake device in foreign object removal mode when the second forward mode is performed in accordance with example embodiments of the present disclosure.
Figure 7:
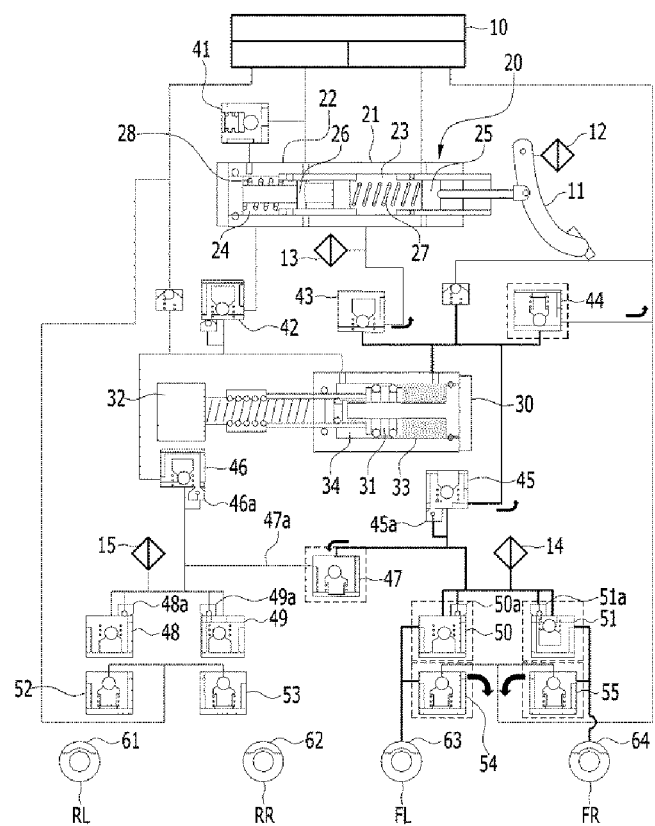
FIG. 7 is a circuit diagram illustrating a hydraulic circuit of a brake device in foreign object removal mode when the second forward mode is performed in accordance with example embodiments of the present disclosure.

FIGS. 6 and 7 are circuit diagrams illustrating a hydraulic circuit when the second forward mode is performed.

The motor 32 to which standby power is applied may operate in the forward direction under the control of the control unit, and the main master cylinder 30 may generate braking hydraulic pressure through the power piston 31 moving forward by the motor.

Power may be applied to the fifth hydraulic regulating valve 45 such that the fifth hydraulic regulating valve may be in a closed state, and power may be applied to the third hydraulic regulating valve 43 such that the third hydraulic regulating valve may be in a closed state. The fourth hydraulic regulating valve 44 may be normally closed when no power is applied, that is, when the power is turned off.

In this state, when the motor 32 is driven and the power piston 31 moves forward such that the pressure of the third chamber 33 increase, the hydraulic oil stored in the third chamber may pass through the check valve 45a of the fifth hydraulic regulating valve 45 and may reach the front wheel cylinders 63 and 64 through the tenth hydraulic regulating valve 50 and the eleventh hydraulic regulating valve 51.

The seventh hydraulic regulating valve 47 may be normally closed when no power is applied, that is, when the power is turned off. Accordingly, the hydraulic oil supplied through the fifth hydraulic regulating valve 45 may not be provided to the rear wheel cylinders 61 and 62.

As such, to apply hydraulic pressure in the second forward mode, power may be applied to the third hydraulic regulating valve 43 and the fifth hydraulic regulating valve 45 for a short period of time and the hydraulic regulating valves may operate. The period of time for when power is applied may be about one second.

To release the pressure in the hydraulic circuit for applying hydraulic pressure to the front wheel cylinders 63 and 64, the power may be turned off in the third hydraulic regulating valve 43 and the fifth hydraulic regulating valve 45 such that the third hydraulic regulating valve and the fifth hydraulic regulating valve may be in an open state. Also, power may be applied to the fourth hydraulic regulating valve 44 and the seventh hydraulic regulating valve 47, such that the fourth hydraulic regulating valve and the seventh hydraulic regulating valve may be in an open state.

Also, power may be applied to the tenth hydraulic regulating valve 50 and the eleventh hydraulic regulating valve 51 such that the tenth hydraulic regulating valve and the eleventh hydraulic regulating valve may be in a closed state. Also, power may be applied to the fourteenth hydraulic regulating valve 54 and the fifteenth hydraulic regulating valve 55, such that the fourteenth hydraulic regulating valve and the fifteenth hydraulic regulating valve may be in an open state. Accordingly, the hydraulic oil from the hydraulic circuit and the front wheel cylinders 63 and 64 may be discharged to the reservoir 10 such that the pressure in the hydraulic circuit may be released.

As such, to release hydraulic pressure in the second forward mode, power may be applied to the fourth hydraulic regulating valve 44, the seventh hydraulic regulating valve 47, the tenth hydraulic regulating valve 50, the eleventh hydraulic regulating valve 51, the fourteenth hydraulic regulating valve 54 and the fifteenth hydraulic regulating valve 55 for a short period of time such that the hydraulic regulating valves may operate. The period of time for when power is applied may be about one second.

In the second forward mode, the third to fifth hydraulic regulating valves 43 to 45, the seventh hydraulic regulating valve 47, the tenth hydraulic regulating valve 50, the eleventh hydraulic regulating valve 51, the fourteenth hydraulic regulating valve 54, and the fifteenth hydraulic regulating valve 55 may operate by the application of power at least one time for about 2 seconds.

Figure 8:
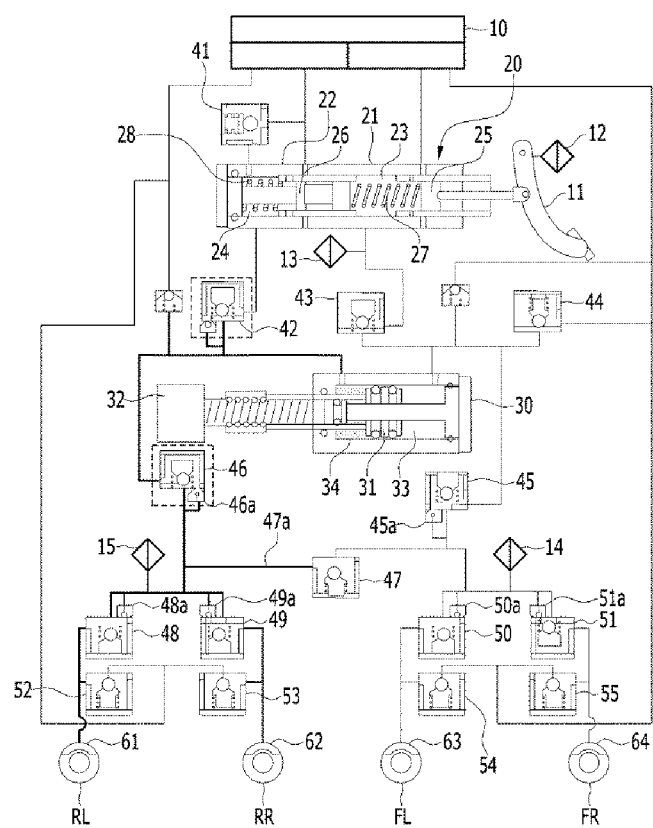
FIG. 8 is a circuit diagram illustrating a hydraulic circuit of a brake device in foreign object removal mode when the second backward mode is performed in accordance with example embodiments of the present disclosure.
Figure 9:
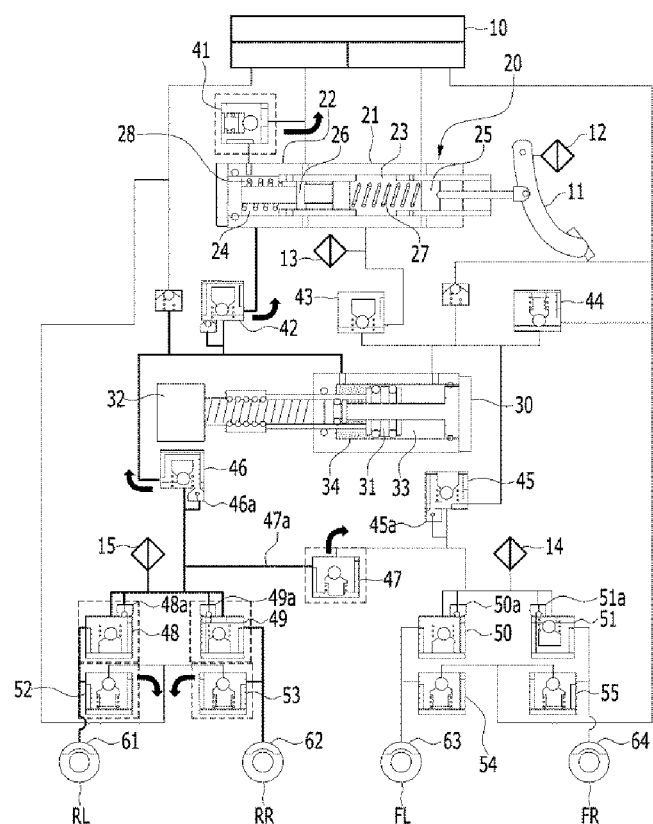
FIG. 9 is a circuit diagram illustrating a hydraulic circuit of a brake device in foreign object removal mode when the second backward mode is performed in accordance with example embodiments of the present disclosure.

FIGS. 8 and 9 are circuit diagrams illustrating a hydraulic circuit when the second backward mode is performed.

The motor 32 to which standby power is applied may operate in the reverse direction under the control of the control unit, and the main master cylinder 30 may generate braking hydraulic pressure through the power piston 31 moving backward by the motor.

Power may be applied to the sixth hydraulic regulating valve 46 such that the sixth hydraulic regulating valve may be in a closed state, and power may be applied to the second hydraulic regulating valve 42 such that the second hydraulic regulating valve may be in a closed state.

In this state, when the motor 32 is driven and the power piston 31 moves backward such that the pressure of the fourth chamber 34 increases, the hydraulic oil stored in the fourth chamber may pass through the check valve 46a of the sixth hydraulic regulating valve 46 and may reach the rear wheel cylinders 61 and 62 through the eighth hydraulic regulating valve 48 and the ninth hydraulic regulating valve 49.

The seventh hydraulic regulating valve 47 may be normally closed when no power is applied, that is, when the power is turned off. Accordingly, the hydraulic oil supplied through the sixth hydraulic regulating valve 46 may not be provided to the front wheel cylinders 63 and 64.

As such, to apply hydraulic pressure in the second backward mode, power may be applied to the second hydraulic regulating valve 42 and the sixth hydraulic regulating valve 46 for a short period of time such that the hydraulic regulating valves may operate. The period of time for when power is applied may be about one second.

To release the pressure in the hydraulic circuit for applying hydraulic pressure to the rear wheel cylinders 61 and 62, the power may be turned off in the second hydraulic regulating valve 42 and the sixth hydraulic regulating valve 46 such that the second hydraulic regulating valve and the sixth hydraulic regulating valve may be in an open state. Also, power may be applied to the first hydraulic regulating valve 41 and the seventh hydraulic regulating valve 47, such that the first hydraulic regulating valve and the seventh hydraulic regulating valve may be in an open state.

Also, power may be applied to the eighth hydraulic regulating valve 48 and the ninth hydraulic regulating valve 49 such that the eighth hydraulic regulating valve and the ninth hydraulic regulating valve may be in a closed state. Also, power may be applied to the twelfth hydraulic regulating valve 52 and the thirteenth hydraulic regulating valve 53 such that the twelfth hydraulic regulating valve and the thirteenth hydraulic regulating valve may be in an open state. Accordingly, the hydraulic oil from the hydraulic circuit and the rear wheel cylinders 61 and 62 may be discharged to the reservoir 10 such that the pressure in the hydraulic circuit may be released.

As such, to release the hydraulic pressure in the second backward mode, power may be applied to the first hydraulic regulating valve 41, the seventh hydraulic regulating valve 47, the eighth hydraulic regulating valve 48, the ninth hydraulic regulating valve 49, the twelfth hydraulic regulating valve 52, and the thirteenth hydraulic regulating valve 53 for a short period of time such that the hydraulic regulating valves may operate. The period of time for when power is applied may be about one second.

In the second backward mode, the first hydraulic regulating valve 41, the second hydraulic regulating valve 42, the sixth to ninth hydraulic regulating valves 46 to 49, the twelfth hydraulic regulating valve 52, and the thirteenth hydraulic regulating valve 53 may operate by the application of power at least one time for about 2 seconds.

FIG. 10 is a table listing hydraulic regulating valves operating in sequence in a foreign object removal mode.

Since the hydraulic regulating valve not described in each forward mode and each backward mode is in a normal state in which power is not applied, a detailed description of the operations therein will not be provided.

As described above, entirety of the plurality of hydraulic regulating valves 40 included in the hydraulic circuit of the brake device may operate by the application of power at least one time for eight seconds in total. Accordingly, in the method of removing foreign objects from the brake device according to an example embodiment, the foreign object removal mode may be swiftly performed within a short period of time, eight seconds.

By the operations described above, in other words, by applying hydraulic pressure to and releasing hydraulic pressure from each of the hydraulic regulating valves 40, foreign objects caught in at least one of the plurality of hydraulic regulating valves may be removed, such that the hydraulic circuit of the brake device may be autonomously restored to a normal state in which no hydraulic leakage occurs.

Referring back to FIG. 1, the method of removing foreign objects from a brake device according to an example embodiment may further include performing a self-diagnosis mode for determining leakage of the hydraulic circuit by operating the main master cylinder 30 using the standby power after performing the foreign object removal mode (S30); determining whether the hydraulic circuit is normal in the self-diagnosis mode (S40); and determining, when the hydraulic circuit is normal, whether the foreign object removal mode is performed one time (S50).

The self-diagnosis mode of the hydraulic circuit may be the same as the process of determining leakage of the hydraulic circuit described above.

The control unit may move forward the power piston 31 of the main master cylinder 30 by, for example, the standby power (S30), and may determine that, when displacement of the power piston reaches a predetermined critical displacement (that is, leakage determination reference displacement) after a predetermined period of time and pressure (measured pressure) formed at a specific critical displacement is above a determined reference pressure (that is, leakage determination reference pressure), the hydraulic circuit is normal (S40).

However, the configuration of the self-diagnosis mode is not limited to the aforementioned example, and the self-diagnosis may be performed in different manners, and it may be identified whether leakage of the hydraulic circuit still occurs or the hydraulic circuit is normal.

When it is confirmed that leakage of the hydraulic circuit still occurs in the self-diagnosis mode, later, that is, after the driver (or a passenger) gets into the vehicle, the control unit may turn on the corresponding warning light in the interior of the vehicle or on the instrument panel or may maintain the restriction of some functions of the vehicle (S41).

Through such a warning message, the driver (or a passenger) may be informed of the malfunctioning situation, and the driver (or a passenger) may be guided to put the vehicle into a repair shop.

When it is confirmed that the hydraulic circuit is normal in the self-diagnosis mode, the control unit may calculate the number of executions of the foreign object removal mode, and may determine whether the number of executions of the foreign object removal mode is one or exceeds one (S50).

When it is confirmed that the foreign object removal mode is performed one time, subsequently, that is, after the driver (or a passenger) gets into the vehicle, the control unit may turn off the corresponding warning light or may restore the restricted functions of the vehicle to be in a normal state (S51).

When it is confirmed that the foreign object removal mode is performed more than one time, subsequently, that is, after the driver (or a passenger) gets into the vehicle, the control unit may continue to turn on the corresponding warning light, but the restricted functions of the vehicle may be restored to be in a normal state (S52).

The information that the foreign object removal mode is performed more than one time may indicate that while the hydraulic circuit may operate normally, foreign objects in the hydraulic circuit, specifically, in at least one of the hydraulic control valves, may not be completely removed, such that leakage may occur again in the hydraulic circuit.

Accordingly, the control unit may control the vehicle to function normally (as before the leakage occurred), but may maintain the corresponding warning light on, thereby guiding the driver (or a passenger) to put the vehicle into a repair shop.

At this point, the method for removing foreign objects from the brake device according to an example embodiment may be ended.

By using the above exemplary methods for removing foreign objects from the brake device, such as by changing only the control logic without adding additional components to address the removal of foreign objects, marketability and safety of the vehicle may improve without significant changes in costs and weight.

While the example embodiments have been illustrated and described above, it will be apparent to those skilled in the art that modifications and variations could be made without departing from the scope in the example embodiment as defined by the appended claims.

What is claimed is:

1. A method of removing foreign objects from a brake device, the method comprising:
    determining whether starting power is turned off in a state in which leakage of a hydraulic circuit is confirmed; and
    operating, while the starting power is turned off, a main master cylinder using standby power, and performing a foreign object removal mode in which hydraulic pressure is applied to a plurality of hydraulic regulating valves in the hydraulic circuit and released,
    wherein the foreign object removal mode includes:
    a first forward mode for moving a power piston of the main master cylinder forward;
    a first backward mode for moving the power piston backward;
    a second forward mode for moving the power piston forward again, and
    a second backward mode for moving the power piston backward again,
    wherein, in the first forward mode and the first backward mode, a portion of the plurality of hydraulic regulating valves operate such that hydraulic pressure reaches a front wheel cylinder and a rear wheel cylinder from the main master cylinder,
    wherein, in the second forward mode, a portion of the plurality of hydraulic regulating valves operate such that hydraulic pressure reaches only the front wheel cylinder from the main master cylinder, and
    wherein, in the second backward mode, a portion of the plurality of hydraulic regulating valves operate such that hydraulic pressure reaches only the rear wheel cylinder from the main master cylinder.

2. The method of claim 1, further comprising:
    determining whether, after the starting power is turned off and a door of a vehicle is opened, a predetermined period of time has elapsed since the door has been closed and locked.

3. The method of claim 1, wherein the foreign object removal mode includes:
    applying the standby power to a motor and moving the power piston of the main master cylinder forward or backward;
    applying, after the power piston is displaced, power to a portion of the plurality of hydraulic regulating valves included in the hydraulic circuit and operating corresponding hydraulic regulating valves; and
    operating an entirety of the plurality of hydraulic regulating valves in sequence by repeating the steps above.

4. The method of claim 1, wherein the foreign object removal mode is performed within eight seconds.

5. A method of removing foreign objects from a brake device, the method comprising:
    determining whether starting power is turned off in a state in which leakage of a hydraulic circuit is confirmed;
    operating, while the starting power is turned off, a main master cylinder using standby power, and performing a foreign object removal mode in which hydraulic pressure is applied to a plurality of hydraulic regulating valves in the hydraulic circuit and released;
    performing a self-diagnosis mode for determining leakage of the hydraulic circuit by operating the main master cylinder using the standby power after performing the foreign object removal mode;
    determining whether the hydraulic circuit is normal in the self-diagnosis mode; and
    determining, when the hydraulic circuit is normal, whether the foreign object removal mode is performed one time,
    wherein, when it is confirmed that the foreign object removal mode is performed one time, the vehicle returns to a normal state wherein leakage of hydraulic pressure does not occur, and wherein, when it is confirmed that the foreign object removal mode is performed more than one time, a warning light is turned on, and some functions of the vehicle restricted due to leakage of the hydraulic circuit are restored to a normal state before the occurrence of the leakage of hydraulic pressure.

6. The method of claim 5, wherein the determining whether the hydraulic circuit is normal in the self-diagnosis mode includes determining that the hydraulic circuit is normal when displacement of a power piston of the main master cylinder reaches a predetermined critical displacement after a predetermined period of time and pressure formed at the predetermined critical displacement is above a reference pressure.

7. The method of claim 5, wherein, when it is confirmed that leakage of the hydraulic circuit still continues in the self-diagnosis mode, a warning light is turned on or some functions of the vehicle are restricted.

\* \* \* \* \*